US008485045B1

(12) United States Patent
Kudo

(10) Patent No.: US 8,485,045 B1
(45) Date of Patent: Jul. 16, 2013

(54) FOAM FREE TESTING SYSTEMS AND METHODS

(75) Inventor: Rance Tetsuo Kudo, Newbury Park, CA (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 13/372,712

(22) Filed: Feb. 14, 2012

(51) Int. Cl.
*G01F 1/00* (2006.01)

(52) U.S. Cl.
USPC ............ 73/861; 73/865.9; 73/861.28; 169/15

(58) Field of Classification Search
None
See application file for complete search history.

(56) References Cited

U.S. PATENT DOCUMENTS

| | | | | |
|---|---|---|---|---|
| 6,588,286 | B1 * | 7/2003 | Kudo et al. | 73/861.79 |
| 6,615,675 | B1 * | 9/2003 | Kudo et al. | 73/861.79 |
| 6,715,373 | B2 | 4/2004 | Kudo | |
| 6,739,174 | B2 * | 5/2004 | Kudo et al. | 73/1.01 |
| 7,290,457 | B2 | 11/2007 | Kudo et al. | |
| 7,293,478 | B2 | 11/2007 | Kudo et al. | |

* cited by examiner

*Primary Examiner* — Harshad R Patel
(74) *Attorney, Agent, or Firm* — Christopher L. Blackburn

(57) ABSTRACT

A system(s) and method(s) of testing the foam delivery system(s) of fire suppression systems. Systems are adapted to test the foam delivery system of a fire suppression system under test while minimizing the release of foam to the environment.

17 Claims, 3 Drawing Sheets

FOAM FREE TESTING SYSTEMS AND METHODS

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

FIELD OF THE INVENTION

The invention(s) generally relates to systems and method of testing foam delivery systems of fire suppression systems.

BRIEF DESCRIPTION OF THE DRAWINGS

FIG. 2B includes a legend for some embodiments of components symbolically represented in FIGS. 1, 2A, and 2B, where present.

Figure 1:
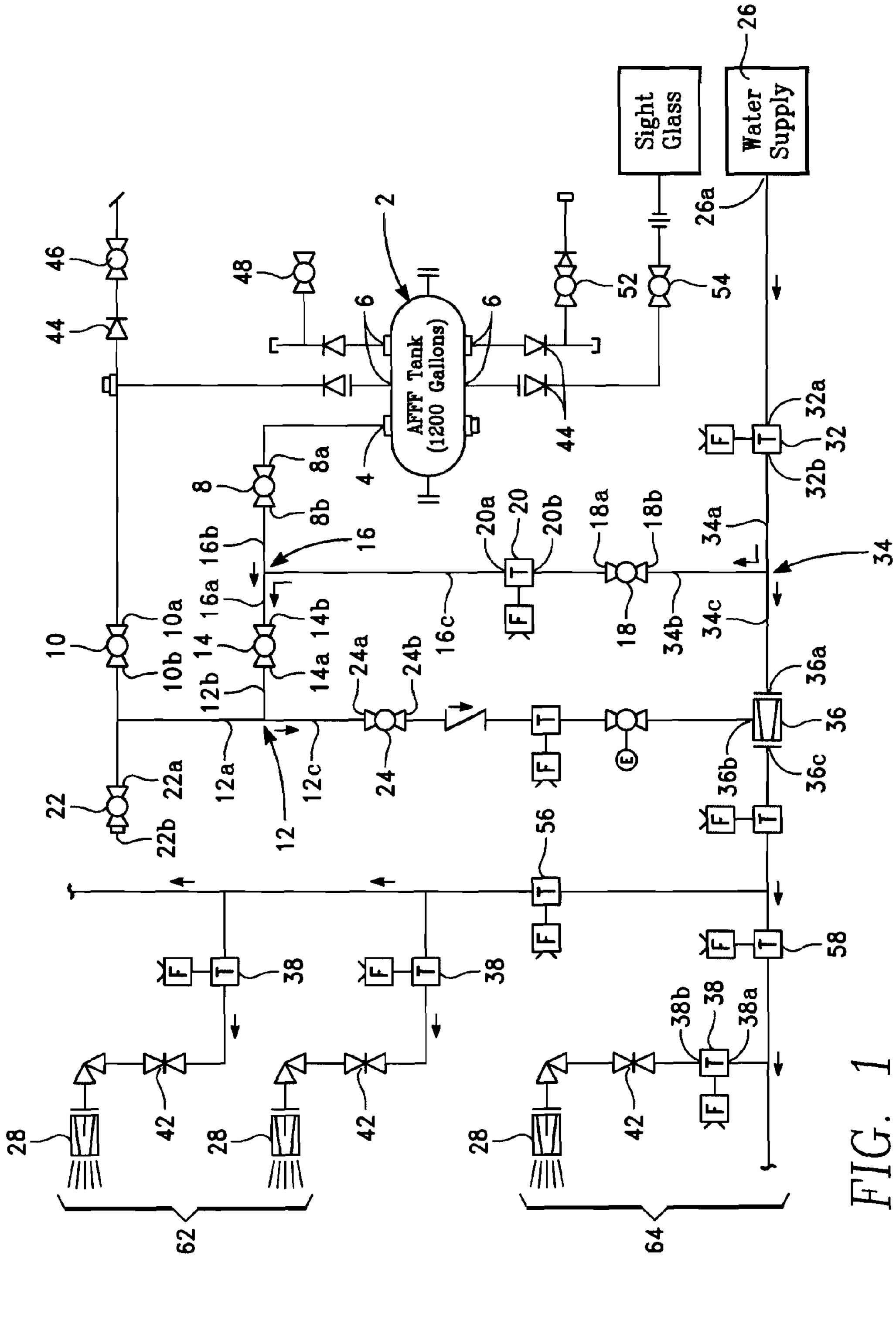
FIG. 1 is a schematic piping and component diagram of an embodiment of an invention as assembled to operate on an embodiment of a fire suppression system under test.

It is to be understood that the foregoing and the following detailed description are exemplary and explanatory only and are not to be viewed as being restrictive of the invention, as claimed.

DETAILED DESCRIPTION OF EMBODIMENTS OF THE INVENTION

Embodiments of the invention generally relate to systems and methods of testing the foam delivery system(s) (which includes the delivery system's piping, valves, pump, proportioner, and nozzles, where present) of fire suppression systems. Embodiments of the foam free testing systems are configured to test the foam delivery system of a fire suppression system under test (or 'being tested'), while minimizing the release of Aqueous Film Forming Foam (AFFF) to the environment. Embodiments of the foam free testing system are adapted to test nozzle discharge of fire suppression systems using water or another environmentally benign substance. Some of the fire suppression systems that embodiments of the invention are used to test are systems that are used in aircraft hangars. Some of the foam free testing system components and aspects are described with reference to functionality of the fire suppression system under test when the fire suppression system under test is operating in a fire suppression mode; however, the fire suppression mode of operation is merely used to illustrate and describe (sometimes structure directed) functionality of components or aspects of embodiments of the invention, which operates in a foam free testing mode. Embodiments of the invention cooperate with, and work on, the fire suppression system that the embodiment is used to test, resulting in a foam free testing system that discharges an environmentally benign liquid (as opposed to the aqueous foam that would typically be discharged during operation in the fire suppression mode).

Note that some embodiments include a flow sensor. The flow sensors are intended to measure surrogate fluid flow through various piping points of the piping system of the system under test.

In some of the embodiments that include a flow sensor, the flow sensor includes transducers and a flow indicator electrically associated with the transmitter. In these embodiments, the flow sensors are clamp-on ultrasonic transit time flow sensors.

In some embodiments, the flow sensors are monitored locally using a data logger that records flow values. In some of the embodiments in which a data logger is included, the logger is electrically operated and battery backed Static Random Access Memory for data storage; sensor connections are four 24-bite pulse channels measure frequency pulses. However, in other embodiments that include a data logger, the data logger is electrically powered by a source other than a battery pack, is formed of a storage medium other than Random Access Memory; includes sensor connections that are not 24-byte; and/or includes a sensor that measures flow by measuring other than frequency pulses.

Also, note that, as previously stated, an environmentally benign surrogate fluid is used for testing. The surrogate fluid is at least partially formed of water from the fire suppression system under test's pre-existing water supply; in some embodiments, a fluorescent yellow/green dye or any other color dye is added to the water which results in a highly visible surrogate fluid (a dye-water fluid). The color of the dye added depends upon user requirements.

Also note that the phrases "foam line piping and components" and "water line piping and components" are used herein to describe the type of fluid and/or foam that respective piping and components of the fire suppression system under test would direct when operating in fire suppression mode. The term "foam line" is used herein to describe the piping and components that the fire suppression system under test would use to direct foam when the fire suppression system under test is operating in fire suppression mode. The term "water line" is used herein to describe the piping and components that the fire suppression system under test would use to direct water when the fire suppression system under test is operating in fire suppression mode.

Also note that a "piping connection" or "connection" as used in this specification including the claims describes a connection that provides (or serves as) a conduit for liquid (and/or foam when operating in fire suppression mode) flow between the pipingly connected components.

Also note that the phrase "water-foam mixing component(s)" is used herein to describe components that the fire suppression system under test would use to mixingly expose foam from its foam supply to water from its water supply.

Also note that some embodiments include components configured to drain residual foam and/or residual surrogate fluid from the foam free testing system and/or from the fire suppression system under test into a storage tank (not illustrated).

Figure 2A:
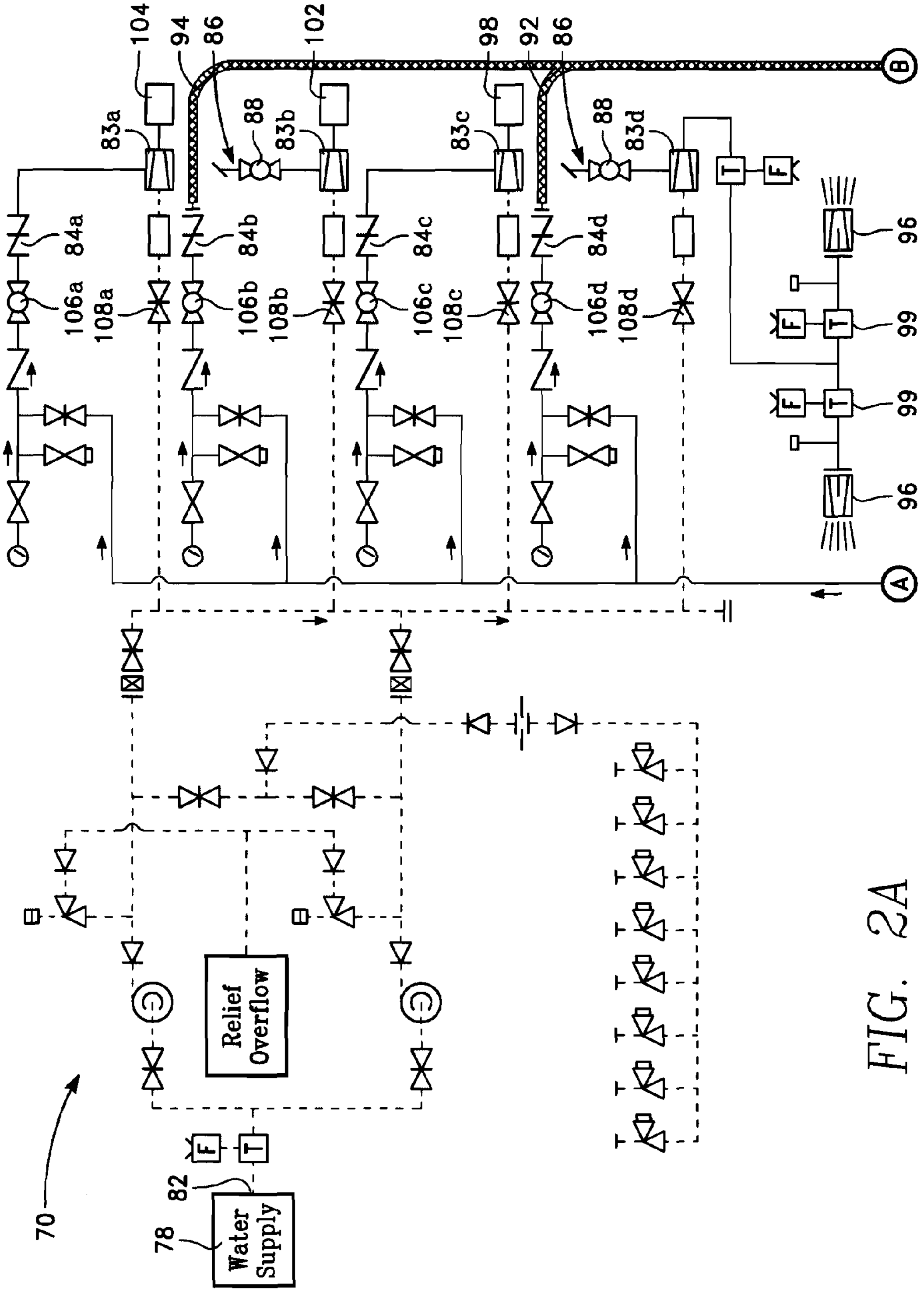
FIGS. 2A and 2B in combination illustrate a schematic piping and component diagram of an embodiment of an invention as assembled to operate on an embodiment of a fire suppression system under test.
Figure 2B:
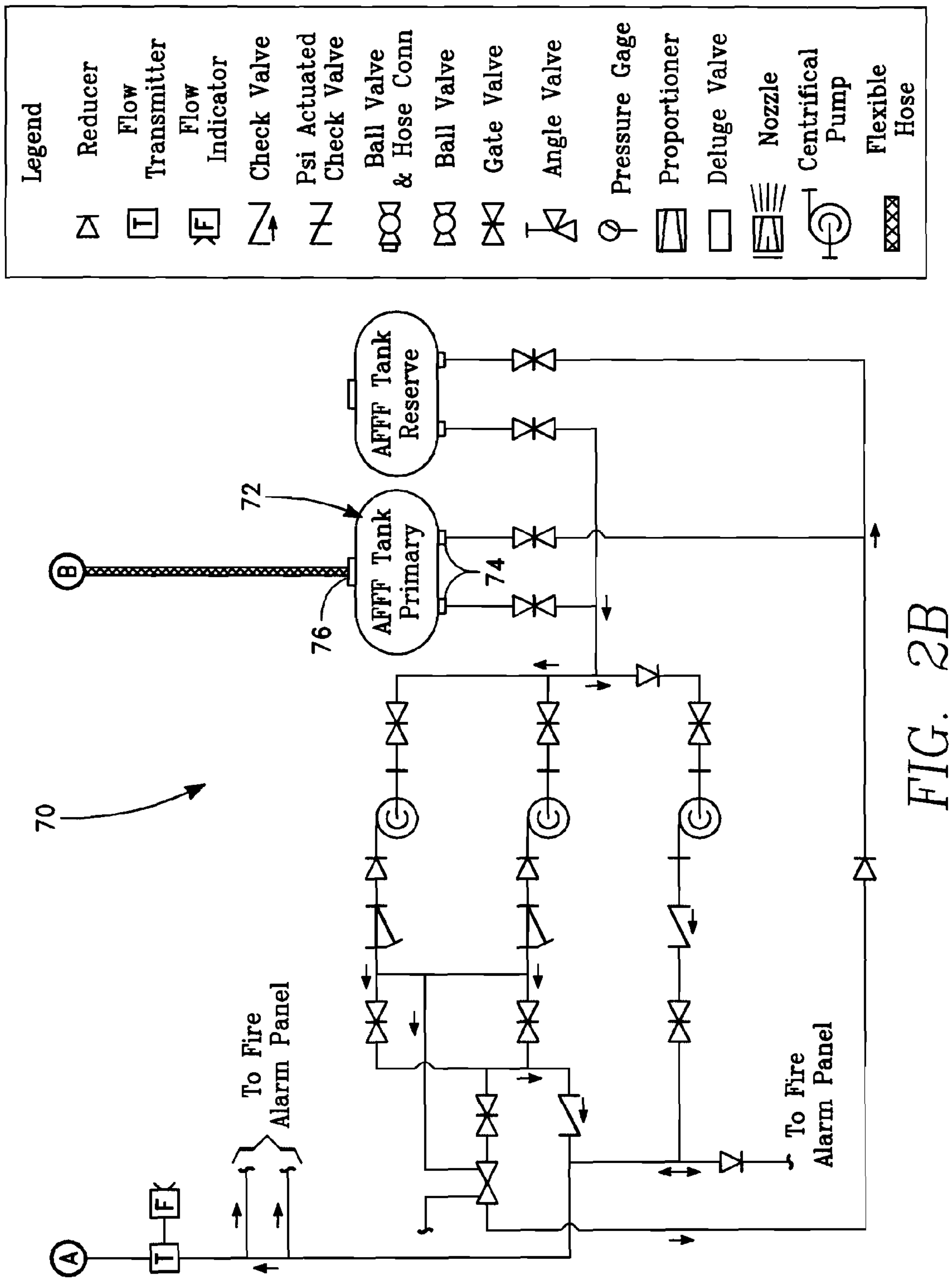

With reference to FIGS. 1, 2A and 2B, note that lines connecting components represent piping. Note that components symbolically represented in FIGS. 1, 2A, and 2B are components included in various embodiments of foam free testing systems functionally attached to some embodiments of fire suppression systems under test; other embodiments of systems under test have different components.

System and method embodiments are described with respect to one of two general system/method types; each of sections A and B infra describes a general system/method types. Note that arrows in FIGS. 1, 2A, and 2B denote flow during operation of the foam free testing system.

A. Embodiments

First General Type

With reference to FIG. 1, foam free testing system embodiments of this general type include a foam concentrate storage container 2 having at least one inlet port 4 and at least one discharge port 6. The foam concentrate storage container 2 is adapted to receive water from the water supply 26 and discharge an aqueous foam mixture when the fire suppression system under test is operating in fire suppression mode.

Foam free testing system embodiments of this general type further include a foam concentrate storage container isolation inlet valve 8 having a first inlet/outlet port 8*a* and a second inlet/outlet port 8*b*. The foam concentrate storage container isolation inlet valve's first inlet/outlet port 8*a* is pipingly connected to the foam concentrate storage container inlet port 4.

Foam free testing system embodiments of this general type further include a foam concentrate storage container isolation outlet valve 10 having a first inlet/outlet port 10*a* and a second inlet/outlet port 10*b*. The foam concentrate storage container isolation outlet valve's first inlet/outlet port 10*a* is pipingly connected to at least one foam concentrate storage container discharge port 6. When the fire suppression system under test is operating in fire suppression mode, foam passes through the foam concentrate storage container outlet valve 10 before reaching the water-foam mixing component; prohibiting foam from flowing through the foam concentrate storage container outlet valve 10 prohibits foam from flowing to the water-foam mixing components 36 (and thus the discharge nozzles).

Foam free testing system embodiments of this general type further include a first T 12 having a first arm 12*a*, a second arm 12*b*, and a third arm 12*c*. Note that as used herein, a "T" describes a piping junction with three arms. The first arm of the first T 12*a* is connected to the foam concentrate storage container isolation outlet valve's second inlet/outlet port 10*b*.

Foam free testing system embodiments of this general type further include a cross connection valve 14 having a first inlet/outlet port 14*a* and a second inlet/outlet port 14*b*. The first inlet/outlet port 14*a* of the cross connection valve is connected to the second arm 12*b* of the first T 12.

Foam free testing system embodiments of this general type further include a second T 16 having a first arm 16*a*, a second arm 16*b*, and a third arm 16*c*. The first arm 16*a* of the second T 16 is connected to the cross connection valve's second inlet/outlet port 14*b*. The second arm 16*b* of the second T 16 is connected to the foam concentrate storage container isolation inlet valve's second inlet/outlet port 8*b*.

Foam free testing system embodiments of this general type further include a first ball valve 18 having a first inlet/outlet port 18*a* and a second inlet/outlet port 18*b*. The first inlet/outlet port 18*a* is pipingly connected to the third arm 16*c* of the second T 16. When the fire suppression system under test is operating in a fire suppression mode, water from the fire suppression system under test's water supply flows through the first ball valve 18, the second flow sensor 20, and the foam concentrate storage container isolation inlet valve 8 to the foam concentrate storage container 2.

Foam free testing system embodiments of this general type further include a second ball valve 24 having a first inlet/outlet port 24*a* and a second inlet/outlet port 24*b*. The third arm of the first T 12*c* is connected to the second ball valve's first inlet/outlet port 24*a*.

Foam free testing system embodiments of this general type include a drain valve 22 having an inlet port 22*a* and a discharge port 22*b*. The inlet port 22*a* of the drain valve 22 is connected to the first arm 12*a* of the first T 12.

Some foam free testing system embodiments of this general type include a first flow sensor 32 having an inlet port 32*a* and an outlet port 32*b*. The first flow sensor 32 is measuringly connected to piping connected to the discharge port 26*a* of the water supply 26 such that the first flow sensor 32 measures flow of water (or surrogate fluid in some embodiments in which water is modified flowingly prior to the first flow sensor) out of the water supply discharge port.

Foam free testing system embodiments of this general type use a water supply 26 having a discharge port 26*a*.

Foam free testing system embodiments of this general type are used to test at least one discharge nozzle. When the fire suppression system under test is operating in fire suppression mode, at least one discharge nozzle is used to discharge a fluid-foam stream. When the foam free testing system is operating, at least one discharge nozzle discharges (assuming operability) surrogate fluid Foam free testing system embodiments of this general type further include a water-foam mixing component 36 having a first inlet port 36*a*, a second inlet port 36*b*, and an outlet port 36*c*, wherein the first inlet port 36*a* of the water-foam mixing component 36 is connected to the third arm 36*c* of a third T 34; the second ball valve 24 prohibits flow of aqueous foam mixture to the second inlet port 36*b* of the water-foam mixing component 36 when the first ball valve is closed. The water-foam mixing component 36 is flowingly located prior to at least one discharge nozzle; in other embodiments, the water-foam mixing component 36 is flowingly prior to all of the discharge nozzles of the fire suppression system under test—thereby, when closed, the water foam mixing component 36 prohibits flow of liquid to any of the fire suppression system under test's discharge nozzles.

The foam concentrate storage container isolation inlet valve 8, the foam concentrate storage container isolation outlet valve 10 and the drain valve 22 are closed, while the second ball valve 24, first ball valve 18, and cross-connection valves 14 are open (as well as the water-foam mixing component), when the foam free testing system is testing the foam delivery system of the fire suppression system under test allowing surrogate fluid to flow through the first and second ball valves 18, 24 and the cross connection valve 14, through the water-foam mixing component to at least one discharge nozzle 28.

The drain valve 22 is open while the foam concentrate storage container isolation outlet valve 10, the cross connection valve 14, and the second ball valve 24 are closed, when residual foam is being drained prior to testing using these embodiments of the foam free testing system.

The drain valve 22 is open while the foam concentrate storage container isolation outlet valve 10, the cross connection valve 14, and the second ball valve 24 are closed, when residual surrogate fluid is being drained after testing using these embodiments of the foam free testing system.

Some foam free testing system embodiments of this general type include a second flow sensor 20 measuringly connected to the third arm 16*c* of the second T 16 such that the second flow sensor 20 measures flow of water (or surrogate fluid in some embodiments in which water is modified flowingly prior to the first flow sensor) out of the water supply discharge port that would be directed through the foam concentrate storage tank isolation inlet valve during operation of the fire suppression system under test in fire suppression mode.

Some foam free testing system embodiments of this general type include a third T 34 having a first arm 34*a*, a second arm 34*b*, and a third arm 34*c*. The first arm of the third T 34*a* is connected to the discharge port 32*b* of the first flow sensor 32. The second arm 34*b* of the third T 34 is connected to the second inlet/outlet port 18*b* of the first ball valve.

In some foam free testing system embodiments of this general type, the water-foam mixing component is a proportioning valve 36 having a first inlet port 36*a*, a second inlet port 36*b*, and an outlet port 36*c*; the first inlet port 36*a* of the proportioning valve 36 is connected to the third arm 34*c* of the third T. The proportioning valve 36 is adapted and configured such that, when the fire-suppression system under test is operating in fire-suppression mode, the proportioning valve 36 regulates the proportion of foam concentrate of the fluid provided to at least one discharge nozzles 28 by mixingly exposing foam from the foam concentrate storage container 2 to surrogate fluid from the water supply 26.

Some foam free testing system embodiments of this general type further include at least one discharge nozzle flow sensor 38 having an inlet port 38*a* and an outlet port 38*b*. At least one discharge nozzle flow sensor 38 is flowingly located between the proportioning valve 36 and at least one discharge nozzle 28; at least one discharge nozzle flow sensor 38 measures flow of fluid through at least one discharge nozzle 28.

Some foam free testing system embodiments of this general type further include at least one of the following components: gate valve(s) 42; reducer(s) 44; third ball valve 46; fourth ball valve 52; fifth ball valve 54; discharge nozzle flow sensor 58 that measures fluid flow to a first set of a plurality of sets of discharge nozzles (such as, for example, floor nozzles) 64; and/or discharge nozzle flow sensor 56 measuring fluid flow to a second set of the plurality of sets of nozzles 62.

Foam free testing method embodiments of this general type include connecting a first inlet/outlet port 8*a* of a foam concentrate storage container isolation inlet valve 8 to piping feeding into a foam concentrate storage container 2 inlet port 4.

Foam free testing method embodiments of this general type further include connecting a first inlet/outlet port 10*a* of a foam concentrate storage container isolation outlet valve 10 to the foam concentrate storage container 2 discharge port 6.

Foam free testing method embodiments of this general type further include connecting a first arm 12*a* of a first T 12, (having a first arm 12*a*, a second arm 12*b*, and a third arm 12*c*), to the foam concentrate storage container isolation outlet valve's second inlet/outlet port 10*b*.

Foam free testing method embodiments of this general type further include connecting a first inlet/outlet port 14*a* of a cross connection valve 14 to the second arm 12*b* of the first T 12.

Foam free testing method embodiments of this general type further include connecting a second arm 16*b* of a second T 16, (having a first arm 16*a*, a second arm 16*b*, and a third arm 16*c*), to the foam concentrate storage container isolation outlet valve's second inlet/outlet port 8*b*.

Foam free testing method embodiments of this general type further include connecting a third arm 16*c* of the second T 16 to a first inlet/outlet port 18*a* of a first ball valve 18 having a first inlet/outlet port 18*a* and a second inlet/outlet port 18*b*.

Foam free testing method embodiments of this general type further include connecting an inlet port 22*a* of a drain valve 22, (having an inlet port 22*a* and a discharge port 22*b*), to the first arm 12*a* of the first T 12.

Foam free testing method embodiments of this general type further include measuring flow out of the water supply by connecting a first flow sensor 32 to piping connected to a discharge port of the water supply 26.

Foam free testing method embodiments of this general type further include prohibiting foam from reaching (flowing to) a foam-water mixing component 36 by closing the foam concentrate storage container isolation inlet valve 8. The foam-water mixing component 36 is located flowingly prior to each of a plurality of discharge nozzles.

Foam free testing method embodiments of this general type further include connecting a second ball valve 24 to a third arm 12*c* of the first T 12.

Foam free testing method embodiments of this general type further include causing surrogate fluid to flow through the first 18 and second ball valves 24 and the cross connection valve 14 (through the water-foam mixing component 36) to at least one discharge nozzle 28 by opening the first ball valve 18, the second ball valve 24, and the cross-connection valve 14, and running water from the water supply 26. Some of these methods include adding a dye or other substance to the water to generate the surrogate fluid. However, in other embodiments, the surrogate fluid consists only of water from the water supply.

Some of the foam free testing method embodiments of this general type further include opening the drain valve 22; closing the foam concentrate storage container isolation outlet valve 10, the cross connection valve 14, and the second ball valve 24; and draining residual foam (in the system) out of the drain valve 22 prior to testing using the foam free testing system.

Some of the foam free testing method embodiments of this general type further include opening the drain valve 22; closing the foam concentrate storage container isolation outlet valve 10, the cross connection valve 14, and the second ball valve 24; and draining residual surrogate fluid (in the system) out of the drain valve 22 after testing using the foam free testing system.

Some of the foam free testing method embodiments of this general type that include opening the drain valve 22; closing the foam concentrate storage container isolation outlet valve 10, the cross connection valve 14, and the second ball valve 24; and draining residual foam (in the system) out of the drain valve 22 prior to testing using the foam free testing system, further include closing the foam concentrate storage container isolation outlet valve 10, the cross connection valve 14, and the first ball valve 18, and draining residual surrogate fluid (in the system) out of the drain valve 22 after testing using the foam free testing system.

B. Embodiments

Second General Type

FIGS. 2A and 2B illustrate an embodiment of a second general type of foam free testing system 70. With reference to FIG. 2B, systems embodiments of this general type include a foam storage container 72. The foam storage container has at least one outlet port 74 and at least one inlet port 76.

With reference to FIG. 2A, foam free testing system embodiments of this general type use a surrogate fluid supply 78 having a discharge port 82.

Foam free testing system embodiments of this general type are used to test at least one discharge nozzle 96, 98, 102, 104. When the fire suppression system under test is operating in fire suppression mode, at least one discharge nozzle 96, 98, 102, 104 is used to discharge a fluid-foam stream. When operating in foam free testing mode, at least one discharge nozzle 96, 98, 102, 104 discharges (assuming operability) surrogate fluid.

Foam free testing system embodiments of this general type include a water piping and component line including water line piping and components. FIG. 2A illustrates a water piping and component line using a dashed line; the foam piping and component line is illustrated in FIGS. 2A and 2B using a solid line. With reference to FIG. 2A, a water piping and component line is any piping line (including components) that is adapted and configured to deliver water from the fire suppression system under test's water supply to each of a plurality of water-foam combination point parts 83*a-d* during operation of the fire suppression system under test in the fire suppression mode. Water-foam combination point parts 83*a-d* are piping components or piping connected to the water piping and component line at a plurality of combination locations; the combination locations are locations at which water from the fire suppression system under test's water supply and foam from the foam storage container are combined when the fire suppression system under test is operating in fire suppression mode. In some embodiments, the combination point parts 83*a-d* are proportioners.

Foam free testing system embodiments of this general type further include a plurality of foam line pre-combination point parts 84*a-d.*

Foam free testing system embodiments of this general type further include a foam piping and component line including foam line piping and components configured to route and pump foam from the foam storage container to the plurality of foam line pre-combination point parts 84 *a-d.* Each of the plurality of foam line pre-combination point parts 84 *a-d* is located on the foam piping and component line. Each of the plurality of foam line pre-combination point parts 84 *a-d* flowingly precedes a corresponding one of the plurality of combination point parts 83 *a-d* such that prohibiting flow of foam through one of the foam pre-combination point parts 84 *a-d* when the fire suppression system under test is operating in fire suppression mode prohibits flow of foam to its corresponding of the plurality of combination point parts 84*a-d* without interrupting flow to any other of the plurality of combination point parts 84 *a-d.*

Foam free testing system embodiments of this general type further include at least one terminal line 86. Each terminal line 86 is configured to connect to one of the combination point parts 83*a-d.*

Foam free testing system embodiments of this general type further include a plurality of terminal line valves 88. Each of the plurality of terminal line valves 88 is located on one of at least one terminal line 86. Each of at least one terminal line 86 and its corresponding terminal line valve(s) 88 is configured to prevent flow of foam to the combination point part 83*a-d* to which the terminal line 86 is connected.

Foam free testing system embodiments of this general type further include at least one bypass line 92, 94. Each of at least one bypass line 92, 94 is connected to one of the plurality of pre-combination point parts 84*a-d* and feeds into the foam storage container when the system is operating in testing mode. Each of at least one bypass line 92, 94 is configured to direct the foam from the pre-combination point part to which it is connected 84*b*, 84*d* to the inlet port of the foam storage container.

Each of at least one terminal line 86 is configured to prevent flow of foam to the nozzles of the plurality of nozzles that the combination point part to which at least one terminal line is connected feeds.

In foam free testing system embodiments of this general type, at least one terminal line 86 and bypass line 92, 94 is associated with at least one of the combination point parts 83*b,d* and its corresponding pre-combination point part 84*b,d* when testing of the fire suppression system under test using the foam free testing system. For any combination point parts that are not connected to a terminal line 83*a,c* and don't have a corresponding pre-combination point part that is connected to a bypass line 84*a,c*, its corresponding ball valves 106*a-d* and gate valves 108*a-d* are closed, thereby prohibiting foam from reaching the combination point part.

In some of foam free testing system embodiments of this general type, the plurality of nozzles includes a first plurality of floor nozzles 96 pipingly associated with a first of the plurality of combination point parts 83*d* through which fluid must flow to reach the first plurality of floor nozzles 96. Each of the first plurality of floor nozzles 96 is pipingly associated with a first of the pre-combination point parts 84*d* through which foam must flow to reach the first plurality of floor nozzles 96 when the fire suppression system under test is operating in fire-suppression mode. Note that in fire suppression mode, the fire suppression system under test is typically configured to direct foam flow from the pre-combination point parts 84 *a-d* to the combination point parts 83*a-d.*

In some foam free testing system embodiments of this general type, the plurality of nozzles includes a second plurality of floor nozzles 102 pipingly associated with a second of the plurality of combination point parts 83*b* through which fluid must flow to reach the second plurality of floor nozzles 102. Each of the second plurality of floor nozzles 102 is pipingly associated with a second of the pre-combination point parts 84*b* through which foam must flow to reach the second plurality of floor nozzles 102 when the fire suppression system under test is operating in fire-suppression mode.

In some foam free testing system embodiments of this general type, the first plurality of ceiling nozzles 98 is pipingly associated with a third of the plurality of combination point parts 83*c* through which fluid must flow to reach the first plurality of ceiling nozzles 98. Each of the first plurality of ceiling nozzles 98 is pipingly associated with a third of the pre-combination point parts 84*c* through which foam must flow to reach the first plurality of ceiling nozzles 98 when the fire suppression system under test is operating in fire-suppression mode.

In some foam free testing system embodiments of this general type, the second plurality of ceiling nozzles 104 is pipingly associated with a fourth of the plurality of combination point parts 83*a* through which fluid must flow to reach the second plurality of ceiling nozzles 104. The second plurality of ceiling nozzles 104 is pipingly associated with a fourth of the pre-combination point parts 84*a* through which foam must flow to reach the second plurality ceiling nozzles 104 when the fire suppression system under test is operating in fire-suppression mode.

Some foam free testing system embodiments of this general type further include a first ball valve 106*d* located on the foam piping and component line flowingly prior to the a first of the plurality of pre-combination point parts 84*d* such that, when closed, the first ball valve 106*d* prohibits flow of foam to the first of the plurality of pre-combination point parts 84*d* without interrupting flow of foam to the other of the plurality of pre-combination point parts 84*a-c.*

Some foam free testing system embodiments of this general type further include a second ball valve 106*c* located on the foam piping and component line flowingly prior to the second of the plurality of pre-combination point parts 84*c* such that, when closed, the second ball valve 106*c* prohibits flow of foam to the second of the plurality of pre-combination point parts 84*c* without interrupting flow of foam to the other of the plurality of pre-combination point parts 84*a,b,d.*

Some of the foam free testing system embodiments of this general type further include a third ball valve 106*b* located on the foam piping and component line flowingly prior to the third of the plurality of pre-combination point parts 84*b* such that, when closed, the third ball valve 106*b* prohibits flow of foam to the third of the plurality of pre-combination point parts 84*b* without interrupting flow of foam to the other of the plurality of pre-combination point parts 84*a, c, d.*

Some of the foam free testing system embodiments of this general type further include a fourth ball valve 106*a* located on the foam piping and component line flowingly prior to the fourth of the plurality of pre-combination point parts 84*a* such that, when closed, the fourth ball valve 106*a* prevents flow of foam to the fourth of the plurality of pre-combination point parts 84*a* without interrupting flow of foam to the other of the plurality of pre-combination point parts 84*b-d.*

Some of the foam free testing system embodiments of this general type further include a first gate valve 108*d* located on the water piping and component line flowingly prior to the first of the plurality of combination point parts 83*d* such that, when closed, the first gate valve 108*d* prohibits flow of water to the first of the plurality of combination point parts 83*d* without interrupting flow of water to the other of the plurality of combination point parts 83*a-c.*

Some of the foam free testing system embodiments of this general type include a second gate valve 108*c* located on the water piping and component line flowingly prior to the second of the plurality of pre-combination point parts 83*c* such that, when closed, the second gate valve 108*c* prohibits flow of foam to the second of the plurality of pre-combination point parts 83*c* without interrupting flow of foam to the other of the plurality of pre-combination point parts 83*a,b,d.*

Some of the foam free testing system embodiments of this general type include a third gate valve 108*b* located on the water piping and component line flowingly prior to the third of the plurality of combination point parts 83*b* such that, when closed, the third gate valve 108*b* prohibits flow of water to the third of the plurality of combination point parts 83*b* without interrupting flow of water to the other of the plurality of combination point parts 83*a,c,d.*

Some of the foam free testing system embodiments of this general type include a fourth gate valve 108*a* located on the water piping and component line flowingly prior to the fourth of the plurality of combination point parts 83*a* such that, when closed, the fourth gate valve 108*a* prevents flow of water to the fourth of the plurality of combination point parts 83*a* without interrupting flow of water to the other of the plurality of combination point parts 83*b-d.*

Some foam free testing system embodiments of this general type further include at least one flow-measuring component 99, each of at least one flow-measuring component is disposed prior to a corresponding one of the plurality of nozzles 96 so as to measure flow out of the plurality of nozzles 96 without measuring flow out of any other of the plurality of nozzles 98, 102, 104.

In some foam free testing system embodiments of this general type, the number of combination point parts 83*a-d* is four and the number of pre-combination point parts 84*a-d* is four.

In some foam free testing system embodiments of this general type, each of the plurality of combination point parts 83*a-d* is a proportioner.

In some foam free testing system embodiments of this general type, each of the plurality of foam line pre-combination point parts 84*a-d* is a check valve.

In some foam free testing system embodiments of this general type, the number of at least one terminal line 86 is two.

Methods of testing fire suppression systems using foam free testing system embodiments of this general type include removing any piping connection between at least one of at least one water-foam combination point parts 83*a-d* and at least one of at least one pre-combination point parts 84*a-d.* Water-foam combination point parts 83*a-d* are components or piping connected to the water piping and component line at a plurality of combination locations. The plurality of combination locations are locations at which water from the surrogate fluid supply and foam from a foam storage container are combined when the fire suppression system under test is operating in fire suppression mode. Each of the foam line pre-combination point parts 84*a-d* is located on a foam piping and component line. The foam piping and component line includes piping and components configured to route and pump foam from the foam storage container to the plurality of pre-combination point parts 84*a-d.* Each of the plurality of foam line pre-combination point parts 84*a-d* flowingly precedes a corresponding one of the plurality of combination point parts such that preventing flow through one of the foam pre-combination point parts prohibits flow to its corresponding of the plurality of combination point parts without interrupting flow to any other of the plurality of combination point parts.

These methods of testing fire suppression systems using foam free testing system embodiments of this general type further include connecting at least one of at least one terminal line 86 to at least one water-foam combination point parts 83*a-d*; the plurality of water-foam combination point parts 83*a-d* being connected to a water piping and component line at a plurality of combination locations. The plurality of combination locations is a plurality of locations at which water from the surrogate fluid supply and foam from a foam storage container are combined when the system is operating in fire suppression mode. The water piping and component line is configured to pump and route water from a surrogate fluid supply to the plurality of water-foam combination point parts 83*a-d.* Each terminal line 86 is connected to a terminal line valve 88; each of the terminal line valve 88 prohibiting flow of foam from the pre-combination point part to which it is connected to its corresponding of the plurality of combination points (corresponding combination point parts and pre-combination point parts are parts that feed to the same plurality of nozzles when the fire suppression system under test is operating in fire suppression mode). In some of these embodiments, the plurality of discharge nozzles includes a plurality of sets of nozzles, with each set of nozzles being supplied through a corresponding of the combination point parts, with each set of nozzles having a unique corresponding combination point part.

These methods of testing fire suppression systems using foam free testing system embodiments of this general type further include connecting at least one of at least one bypass line 92, 94 to at least one of at least one pre-combination point parts 84*b, d.* Each of at least one bypass line 92, 94 is configured to direct the foam from the pre-combination point parts 84*b, d* to the inlet port of the foam storage container. Each of the plurality of foam line pre-combination point parts 84*b,d* flowingly precedes a corresponding one of the plurality of combination point parts such that prohibiting flow through one of the foam pre-combination point parts prohibits flow to its corresponding of the plurality of combination point parts without interrupting flow to any other of the plurality of combination point parts.

These methods of testing fire suppression systems using foam free testing system embodiments of this general type further include prohibiting foam from the foam storage containers from reaching pre-combination point parts to which a bypass line 92,94 is not connected.

These methods of testing fire suppression systems using foam free testing system embodiments of this general type further include testing nozzles on the system without discharging foam by closing at least one terminal line valves 88 and causing foam from the foam storage container to flow through at least one bypass lines 92, 94 to the foam storage container.

These methods of testing fire suppression systems using foam free testing system embodiments of this general type include allowing liquid pumped from the water supply to flow through at least one combination point parts 83*a-d* to at least one discharge nozzle 96, 98, 102, 104. Note that, as previously mentioned, liquid that is discharged from the discharge nozzles during testing using the foam free testing system includes water from the water supply; however, in some embodiments, substances are added to the water from the water supply prior to the fluid being discharged from at least one discharge nozzle.

Some methods of testing fire suppression systems using foam free testing system embodiments of this general type further include adding a substance to the water from the water supply prior to discharging from the discharge nozzles, resulting in an environmentally benign surrogate fluid. In some of the embodiments, the substance added to the water from the water supply is a dye.

In methods of testing fire suppression systems using foam free testing system embodiments of this general type, at least one terminal line 86 and bypass line 92, 94 is associated with at least one of the combination point parts 83*b,d* and its corresponding pre-combination point part 84*b,d* when testing of the fire suppression system under test using the foam free testing system. For any combination point parts that are not connected to a terminal line 83*a,c* and don't have a corresponding pre-combination point part that is connected to a bypass line 84*a,c*, one of the gate valves 108*a*, 108*c* and its corresponding ball valve 106*a,c* is closed, prohibiting foam from reaching the combination point part 83*a,c* and prohibiting water from being discharged from the terminal line 83*b,d*.

Some methods of testing fire suppression systems using foam free testing system embodiments of this general type further include opening at least one terminal line valves 88 and draining residual foam out of at least one terminal valves 88 prior to testing of the foam free testing system.

Some methods of testing fire suppression systems using foam free testing system embodiments of this general type further include opening at least one terminal line valves 88 and draining residual surrogate fluid out of at least one terminal line valves 88 after testing using the foam free testing system.

Some methods of testing fire suppression systems using foam free testing system embodiments of this general type embodiments in which residual foam is drained prior to testing further include opening at least one terminal line valves 88 and draining residual surrogate fluid out of at least one terminal line valves 88 after testing using the foam free testing system.

In some methods of testing fire suppression systems using foam free testing system embodiments of this general type, the plurality of discharge nozzles includes a plurality of sets of nozzles, with each set of nozzles being supplied through a corresponding of the combination point parts and having a unique corresponding combination point part.

In some methods of testing fire suppression systems using foam free testing system embodiments of this general type, the plurality of nozzles includes a first set of floor nozzles 96, a second set of floor nozzles 98, a first set of ceiling nozzles 102, and a second set of ceiling nozzles 104.

Note that FIGS. 2A and 2B illustrate a foam free system adapted to test two sets of plurality of nozzles 96, 102. However, other embodiments are configured and adapted for use to test one or more (including all) of the nozzles within the principles of embodiments of the invention described herein. For example, the plurality of nozzles designated by number 104 could be tested by: removing piping connection between water-foam combination point part 83*a* and pre-combination point part 84*a*; connecting a terminal line and valve to water-foam combination part 83*a*; closing the terminal line valve associated with terminal line connected to water-foam combination point part 83*a*; connecting a bypass line to pre-combination point part 84*a*; closing ball 106*b* and gate valves 108*b* associated with a plurality of nozzles 98 that are associated with pre-combination point part 84*c* to which a bypass line is not connected and a water-foam combination point part 83*c* to which a terminal line is not connected; and running water and foam from the water supply and foam storage container, respectively.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:

1. A foam free testing system, comprising:

a water supply having a discharge port;

at least one drain valve having an inlet port and a discharge port;

a foam concentrate storage container having at least one inlet port and at least one discharge port;

at least one foam concentrate storage container isolation inlet valve having a first inlet/outlet port and a second inlet/outlet port, said at least one foam concentrate storage container isolation inlet valve's first inlet/outlet port being pipingly connected to said foam concentrate storage container inlet port; said at least one foam concentrate storage container isolation inlet valve prohibiting flow of water from said water supply to said foam concentrate storage container when said at least one foam concentrate storage container isolation inlet valve is closed;

at least one foam concentrate storage container isolation outlet valve having a first inlet/outlet port and a second inlet/outlet port, said at least one foam concentrate storage container isolation outlet valve's first inlet/outlet port being pipingly connected to said at least one foam concentrate storage container discharge port; said at least one foam concentrate storage container isolation outlet valve prohibiting flow of foam from said foam storage container to said at least one drain valve when said at least one foam concentrate storage container isolation outlet valve is closed;

a first T having a first arm, a second arm, and a third arm, said first arm of said first T being connected to said at least one foam concentrate storage container isolation outlet valve's second inlet/outlet port; said inlet port of said at least one drain valve being connected to said first arm of said first T;

at least one cross connection valve having a first inlet/outlet port and a second inlet/outlet port, said first inlet/outlet port of said at least one cross connection valve being connected to said second arm of said first T;

a second T having a first arm, a second arm, and a third arm, said first arm of said second T being connected to said at least one cross connection valve's second inlet/outlet port, said second arm of said second T being connected to said at least one foam concentrate storage container isolation outlet valve's second inlet/outlet port;

a first ball valve having a first inlet/outlet port and a second inlet/outlet port, said third arm of said second T being connected to said first ball valve's first inlet/outlet port;

a first flow sensor measuringly connected to piping connected to said discharge port of said water supply;

a second ball valve having a first inlet/outlet port and a second inlet/outlet port, said third arm of said first T being connected to said second ball valve's first inlet/outlet port;

at least one discharge nozzle to discharge a surrogate fluid during testing using said foam free testing system, said surrogate fluid being at least partially formed of water from said water supply;

a third T having a first arm, a second arm, and a third arm, wherein said first arm of said third T is connected to said discharge port of said first flow sensor and said second arm of said third T is connected to said second inlet/outlet port of said first ball valve;

a water-foam mixing component having a first inlet port, a second inlet port, and an outlet port; said first inlet port of said water-foam mixing component being connected to said third arm of said third T; said second ball valve prohibiting flow of aqueous foam mixture to said second inlet port of said water-foam mixing component when said first ball valve is closed; said water-foam mixing component being flowingly located prior to said at least one discharge nozzle;

said at least one foam concentrate storage container isolation inlet valve, said at least one foam concentrate storage container isolation outlet valve and said at least one drain valve being closed, while said first ball valve, said second ball valve, and said cross-connection valve are open causing surrogate fluid to flow through said first and second ball valves and said at least one cross connection valve to said second inlet port of said water-foam mixing component when water from said water supply is run;

said at least one drain valve being open while said at least one foam concentrate storage container isolation inlet valve and said at least one foam concentrate storage container isolation outlet valve, said at least one cross connection valve, and said second ball valve are closed, when residual foam is being drained prior to testing of said foam free testing system; and said at least one drain valve being open while said foam concentrate storage container isolation valve, said at least one cross connection valve, and said second ball valve are closed, when residual surrogate fluid is being drained after testing of said foam free testing system.

2. The system of claim 1, further comprising a second flow sensor having a first inlet/outlet port and a second inlet/outlet port, said first inlet/outlet port of said second flow sensor being measuringly connected to said third arm of said first T.

3. The system of claim 2, wherein said water-foam mixing component is a proportioner.

4. The system of claim 3, further comprising at least one discharge nozzle flow sensor having an inlet port and an outlet port, said at least one discharge nozzle flow sensor flowingly located between said proportioning valve and said at least one discharge nozzle; said at least one discharge nozzle measuring flow of fluid that arrives at said at least one discharge nozzle.

5. The system of claim 4, further comprising at least one gate valve having an inlet port and an outlet port, said inlet port of said at least one gate valve being pipingly connected to said at least one discharge nozzle flow sensor outlet port.

6. The system of claim 4, wherein a 2.5 inch piping connects said second inlet/outlet port of said at least one foam concentrate storage container isolation inlet valve and said second arm of said second T.

7. The system of claim 6, wherein a 2.5 inch piping connects said second inlet/outlet port of said at least one cross connection valve to said first arm of said first T.

8. The system of claim 7 wherein said first flow sensor includes a transit time ultrasonic flow sensor.

9. The system of claim 1 wherein said first flow sensor includes a transit time ultrasonic flow sensor.

10. A method of testing a fire suppression system using a foam free testing system, comprising:

connecting a first inlet/outlet port of a foam concentrate storage container isolation inlet valve to an inlet port of a foam concentrate storage container;

connecting a first inlet/outlet port of a foam concentrate storage container isolation outlet valve to a discharge port of said foam concentrate storage container;

connecting a first arm of a first T to a second inlet/outlet port of said foam concentrate storage container isolation outlet valve;

connecting a first inlet/outlet port of a cross connection valve to a second arm of said first T;

connecting a second arm of a second T to said foam concentrate storage container isolation inlet valve's second inlet/outlet port;

connecting a third arm of said second T to a first inlet/outlet port of a first ball valve having a first inlet/outlet port and a second inlet/outlet port;

connecting an inlet port of a drain valve to said first arm of said first T;

connecting a first flow sensor to a discharge port of a water supply;

connecting said first inlet/outlet port of said first ball valve to an inlet port of a second flow sensor;

prohibiting foam from reaching a foam-water mixing component by closing said foam concentrate storage container isolation inlet valve, said foam-water mixing component located flowingly prior to each of a plurality of discharge nozzles; and causing surrogate fluid to flow through said first and second ball valves and said cross connection valve to said plurality of discharge nozzles by opening said first ball valve, said second ball valve, and said cross-connection valve, and running water from said water supply.

11. The method of claim 10, further comprising:

opening said drain valve;

closing said foam concentrate storage container isolation outlet valve, said cross connection valve, and said second ball valve; and draining residual foam from said fire suppression system prior to testing using said foam free testing system.

12. The method of claim 10, further comprising:

opening said drain valve;

closing said foam concentrate storage container isolation outlet valve, said cross connection valve, and said second ball valve; and draining residual surrogate fluid from said fire suppression system after testing using said foam free testing system.

13. The method of claim 12, further comprising:

opening said drain valve;

closing said foam concentrate storage container isolation outlet valve, said cross connection valve, and said second ball valve; and draining residual foam from said fire suppression system prior to testing using said foam free testing system.

14. The method of claim 13, further comprising measuring discharge out of each of said plurality of discharge nozzles.

15. The method of claim 14, wherein said measuring discharge out of each of said plurality of discharge nozzles task is performed using an ultrasonic transducer.

16. The method of claim 13, wherein said measuring discharge out of each of said plurality of discharge nozzles task is performed using an ultrasonic transducer.

17. The method of claim 10, further comprising measuring discharge out of each of said plurality of discharge nozzles.

* * * * *